United States Patent [19]

Mazzorana

[11] 4,187,728
[45] Feb. 12, 1980

[54] UNIDIRECTIONAL DRIVE SYSTEMS

[75] Inventor: Alfred Mazzorana, Venissieux, France

[73] Assignee: Societe de Paris et du Rhone, Lyon, France

[21] Appl. No.: 872,207

[22] Filed: Jan. 25, 1978

[30] Foreign Application Priority Data

Jan. 31, 1977 [FR] France .................................. 77 03091

[51] Int. Cl.$^2$ ...................... F02N 15/06; F16D 41/12; F16D 43/20
[52] U.S. Cl. ............................................. 74/6; 74/7 A; 192/42; 192/46; 192/47; 192/104 C; 192/114 R
[58] Field of Search ................ 192/46, 42, 47, 104 C, 192/114 R; 74/6, 7 R, 7 A

[56] References Cited

U.S. PATENT DOCUMENTS

| | | | |
|---|---|---|---|
| 1,509,446 | 9/1924 | Skinner | 192/47 |
| 1,833,601 | 11/1931 | Batterman et al. | 192/47 X |
| 2,258,455 | 10/1941 | Jones | 74/6 |
| 2,364,980 | 12/1944 | Jimerson | 192/104 C |
| 2,594,642 | 4/1952 | Gross et al. | 192/104 C X |
| 2,640,359 | 6/1953 | Gilbert et al. | 192/104 C X |
| 2,988,186 | 6/1961 | Dotter | 192/47 |
| 3,263,509 | 8/1966 | Digby | 74/6 |

FOREIGN PATENT DOCUMENTS 443590 3/1936 United Kingdom .

*Primary Examiner*—Allan D. Herrmann
*Attorney, Agent, or Firm*—Dowell & Dowell

[57] ABSTRACT

A unidirectional drive system, particularly intended for electric starter motors of internal combustion engines, comprises a ratchet wheel surrounded by a cage having one or more pivoted pawls. These pawls can either be in engagement with the ratchet wheel or can move out of such engagement, generally as a result of centrifugal force. A stop device, which may be a cylindrical ring or a pair of discs, can move into position to hold the pawls out of engagement with the ratchet wheel.

11 Claims, 11 Drawing Figures

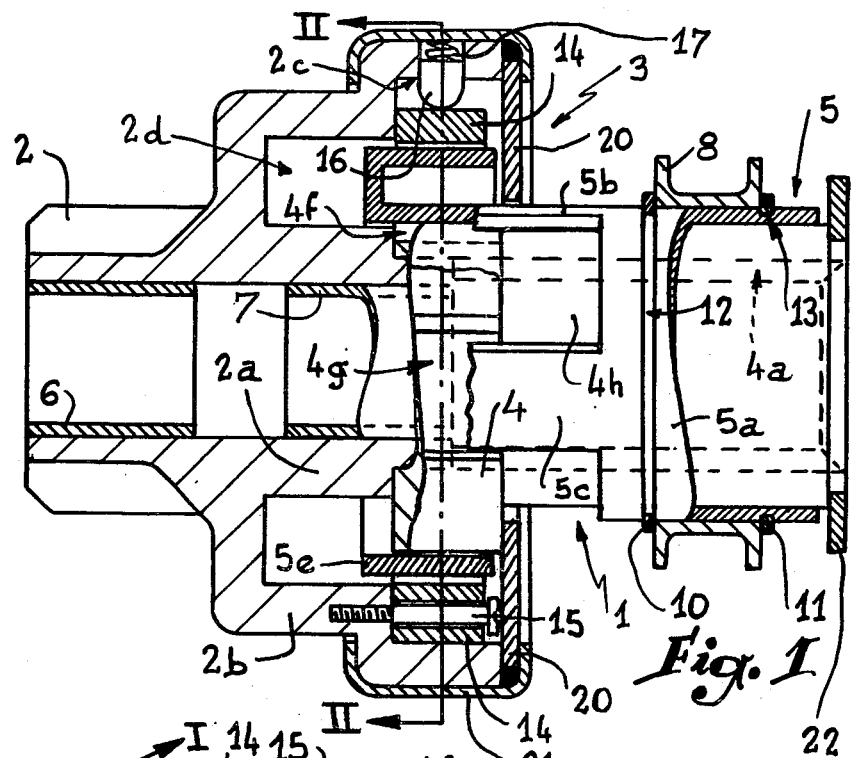
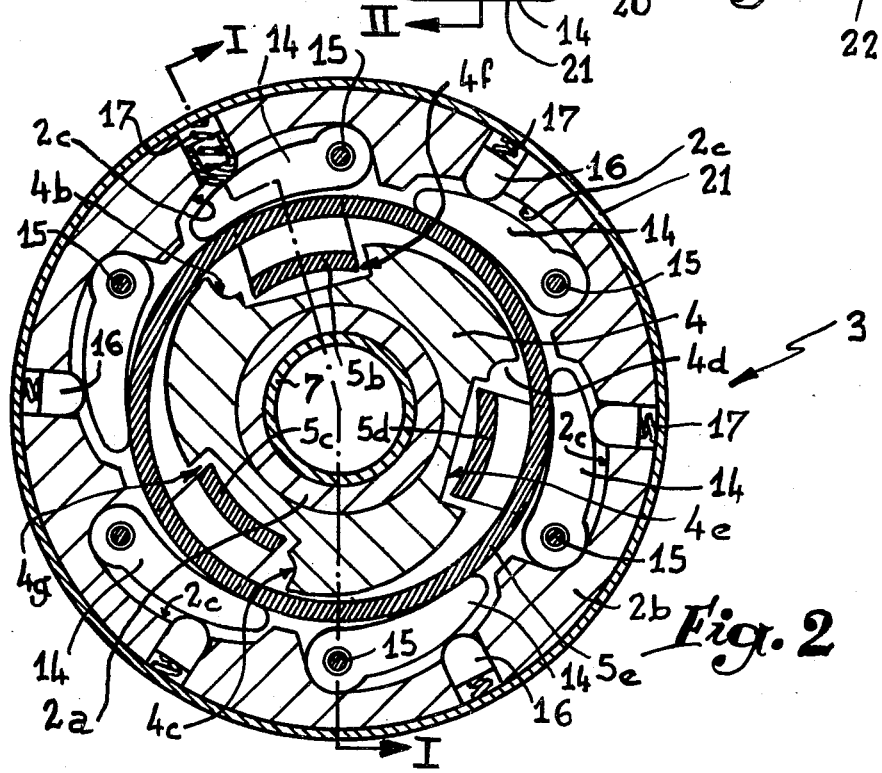

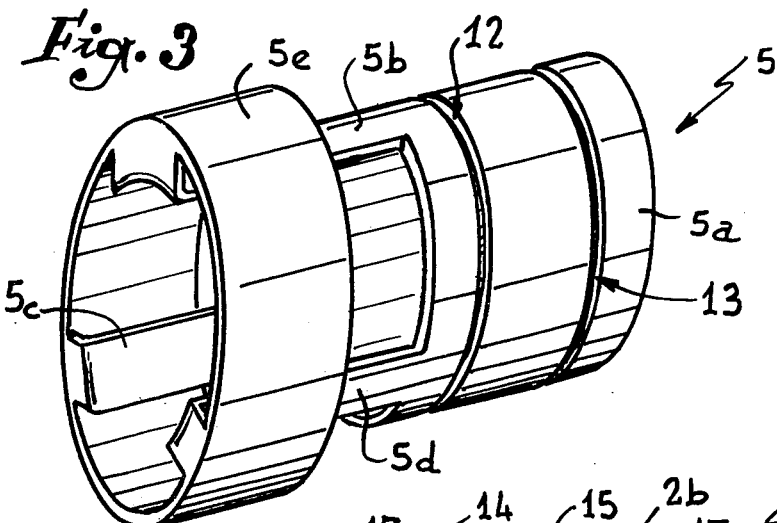
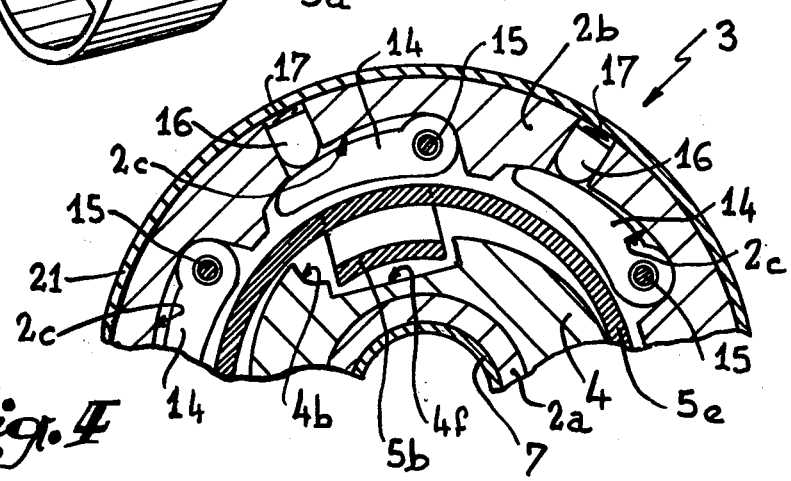
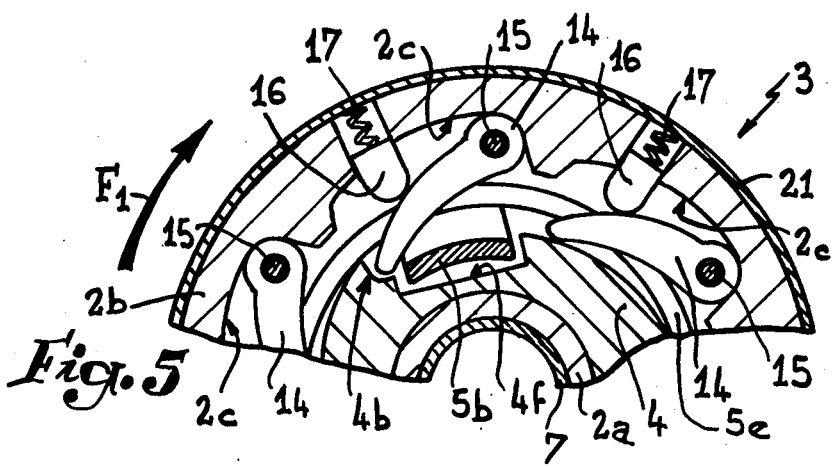

UNIDIRECTIONAL DRIVE SYSTEMS

BACKGROUND OF THE INVENTION

1. Field of the Invention

The present invention relates to improvements made in unidirectional drive systems which are more particularly, but not exclusively, intended for association with the drive pinion assembly of an electric starter for an internal combustion engine.

2. Description of the Prior Art

At the present time such starters comprise a driver and a pinion, which are connected together by a unidirectional driving mechanism, which is generally of the roller type. These mechanisms have a limited life because of the wear occurring both on the rollers and on the surfaces with which the rollers are in contact.

SUMMARY OF THE INVENTION

This invention provides an unidirectional drive system comprising a ratchet wheel, a cage round the ratchet wheel, at least one pivotted pawl on the cage which can move into a first position in engagement with the ratchet wheel under the influence of biassing means and into a second position out of engagement with the ratchet wheel, and a movable stop device which can be so located as to hold the pawl in its second position. The stop device may comprise a ring which moves between the pawl or pawls and the ratchet wheel or alternatively at least one disc, preferably two discs, which can be positioned so as to prevent the pawl or pawls from engaging the ratchet wheel.

Particularly when the drive system is used for an electric starter the pawl or pawls may be so mounted as to move into their second position under the influence of centrifugal force caused by rotation of the cage.

According to a second aspect of the invention it provides a drive pinion assembly for a starter having an electric motor comprising a ratchet wheel adapted to be driven by the starter motor, a cage round the ratchet wheel, a drive pinion connected to the cage for rotation therewith, at least one pivotted pawl on the cage which can move into a first position in engagement with the ratchet wheel under the influence of biassing means, and into a second position out of engagement with the ratchet wheel under the influence of centrifugal force caused by rotation of the cage, and a movable stop device which, when the pawl is in its second position, can be so located as to prevent the pawl from engaging with the ratchet wheel.

BRIEF DESCRIPTION OF THE DRAWINGS

Two forms of the invention will be described, by way of example, in the accompanying drawings, in which:

FIG. 1 is a longitudinal view, mostly in section of a drive pinion assembly for an electric starter, taken on the line I—I of FIG. 2;

FIG. 2 is a section on the line II—II of FIG. 1;

FIG. 3 is a view in perspective of the stop device and associated sleeve;

FIGS. 4 and 5 are views similar to that in FIG. 2, but in partial form only, and showing respectively the pawls in their second and first positions, that is to say respectively completely disengaged and engaged with the ratchet wheel;

DESCRIPTION OF THE PREFERRED EMBODIMENTS

Figure 6:
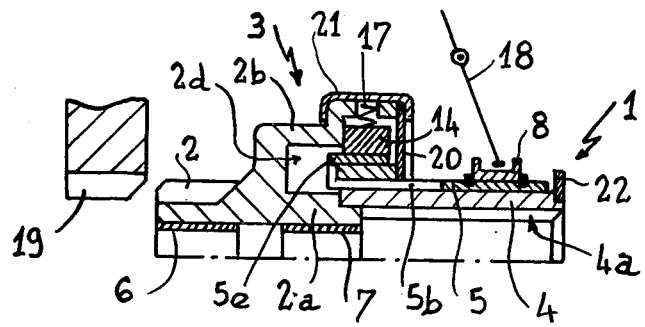
FIGS. 6 to 9 show the drive pinion assembly in different operating positions.

In FIG. 1 is shown a drive pinion assembly of an electric starter for an internal combustion engine, which assembly comprises a driver 1 and a pinion 2 connected together by a unidirectional drive system 3. The driver 1 comprises two parts, namely a ratchet wheel 4 and a sliding sleeve assembly 5. The ratchet wheel 4 is provided with a splined bore 4a adapted to cooperate with the longitudinally grooved portion of the shaft (not illustrated) of the starter motor, while its outer portion has three teeth 4b, 4c, 4d, between each of which a passage 4e, 4f, 4g is provided for reasons which will be more fully explained later on.

The sliding sleeve assembly 5 is engaged for sliding without substantial play on a smooth cylindrical portion 4h of the ratchet wheel 4 situated to its right in FIG. 1. The pinion 2 is mounted through bearings 6,7 for free rotation on a smooth portion of the starter motor shaft. A flanged ring 8 is mounted for free rotation on the sleeve assembly 5, but is axially fixed in relation to the latter by means of two circlips 10,11. As shown in FIG. 3, the sliding sleeve assembly 5 has a tubular sleeve portion 5a in which are formed grooves 12,13 for the circlips 10,11, the inside diameter of the sleeve being equal, allowing for clearance, to that of the smooth portion 4h of the ratchet wheel 4. The sleeve 5a is extended by three longitudinal arms 5b, 5c, 5d, of curved transverse profile, the ends of which arms are bent over at 90° at 5i to form radial extensions which support a ring 5e in the form of a thin walled cylinder at a certain distance from the said arms 5b, 5c, 5d. These arms extend beyond the ratchet wheel 4 in the direction of the left side of the drawings, and they pass through the said wheel with clearance in the passages 4e, 4f and 4g.

As shown in FIG. 1, the pinion 2 is provided with an axial tubular sleeve 2a the diameter of which is smaller than that of the bore of the sliding sleeve 5a and which is centred in the usual manner in relation to the ratchet wheel 4. Around the sleeve 2a the pinion is provided with a tubular cage 2b, the inside diameter of which is greater than that of the ring 5e of the sleeve 5. The tubular cage 2b is provided with six identical radial slots 2c, in each of which is placed a pawl 14 mounted for rotation about a longitudinal pin 15. Each pawl is urged towards the centre by means of a finger 16 acted on by a spring 17. Obviously, the assembly 16,17 could be replaced by any other elastic means, such as a leaf spring situated in each slot 2c.

It will be noted that each pawl 14 has a bore in which the corresponding pin 15 is engaged with substantial clearance, as will be explained more fully below.

The operation is clear from the explanations given above. In the state of rest, that is to say when the internal combustion engine with which the starter of the invention is associated is running or is stationary, the drive pinion assembly is in the position shown in FIGS. 1, 2 and 6. The pawls 14 rest against the peripheral face of the ring 5e, so that the pinion 2 is completely independent of the driver 1.

Figure 7:
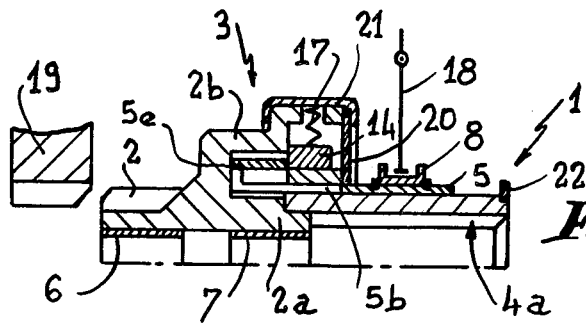

If it is desired to operate the starter for the purpose of starting the internal combustion engine, a suitable control is actuated, which moves an operating lever 18 (shown diagrammatically in FIGS. 6 to 9) which straddles the ring 8 and axially displaces the sliding sleeve 5a. As shown in FIGS. 6 and 7, the ring 5e is displaced so as to be received in an annular space 2d of the pinion 2, situated between the sleeve 2a and the cage 2b. Wherein the portion 5i abuts against an abutment 2e of the pinion. Consequently, the pawls 14 are freed and take up the position shown in FIG. 5 because of the action of each finger 16 subjected to the action of the corresponding spring 17. It will be noted that the pinion 2 is not yet in contact with the large crown wheel 19 of the internal combustion engine, and that obviously three of the six pawls 14 are cooperating with the three teeth of the ratchet wheel 4.

The action of the lever 18 is then continued so that the sliding sleeve 5, which now abuts the pinion 2, pushes it in such a manner that it contacts the large crown wheel 19. Then, on rotation by the starter motor of the ratchet wheel 4, the pinion penetrates into the teeth of the large crown wheel (FIG. 8) and drives the latter, because any rotation of the ratchet wheel 4 in the direction of the arrow $F_1$ will entail the rotation of the pinion 2 through the medium of the pawls 14, either immediately or after a certain angular travel of the ratchet wheel if the ends of the pawls have passed beyond the level of the corresponding teeth. As shown in FIG. 5, and because of the considerable play existing between the pin 15 and the corresponding bore the action of each pawl affected is transmitted to the cage 2b because its heel bears against the corresponding zone of its slot. Thus, the pins 15 are subjected to practically no effort.

Figure 9:
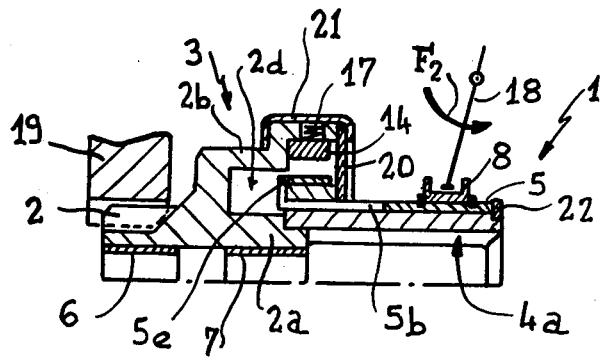

Once the internal combustion engine has been started up, its large crown wheel 19 entails the rotation of the pinion 2 at a higher speed than that of the ratchet wheel, so that the centrifugal force of the pawls exceeds the reaction of the springs 17 and causes them to swing, so that the pinion and the driver are disengaged; furthermore, the said force applies the pawls against the bottom of the corresponding slot 2c (FIG. 9). As the control means operating the lever 18 has then been released, the said lever pivots in the opposite direction (arrow $F_2$) so as to bring the sliding sleeve assembly 5 into its original position, its ring 5e taking up position under the pawls which are still raised.

Finally, it will be noted that in the usual manner the driver and the pinion are connected axially by means of two half-washers 20 held in relation to the cage 2b by means of a hoop 21 folded over round a collar on the cage and embracing the half-washers. In this manner, when the lever 18 pivots in the direction of the arrow $F_2$, so as to bring the drive pinion assembly to its original position, the ring 5e first performs an idle movement equal to the depth of the space 2d thus preventing the pawls from re-engaging the ratchet wheel; then the sleeve 5 comes to bear against an abutment 22 fastened to the rear of the ratchet wheel 4, so as to bring the assembly back to the original position shown in FIGS. 1, 2 and 6.

Figure 10:
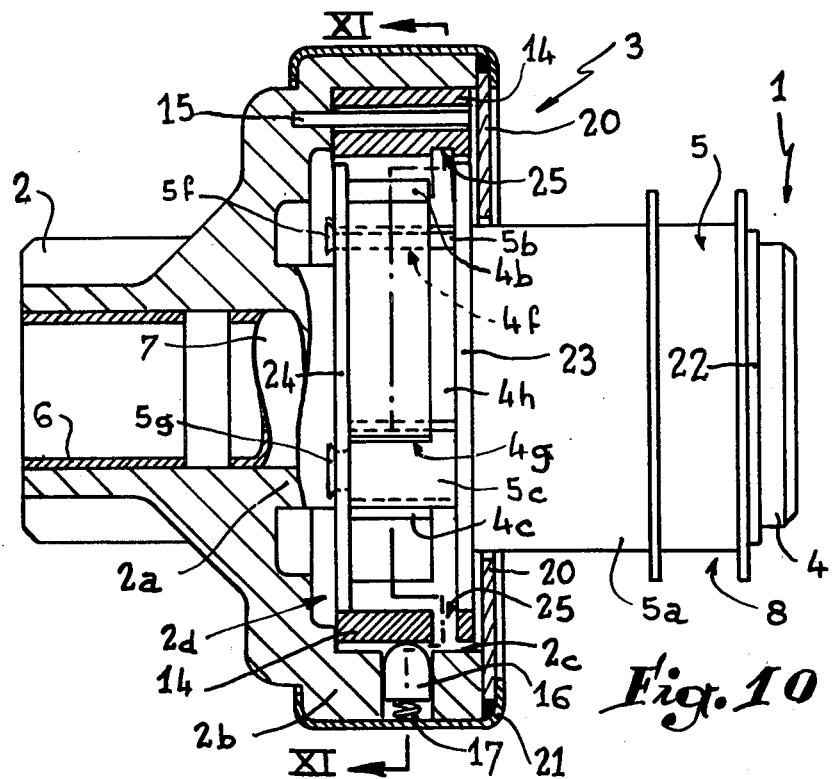
FIG. 10 is a view similar to that shown in FIG. 1, but illustrating a modified embodiment, being taken in part on the line X—X of FIG. 11.
Figure 11:
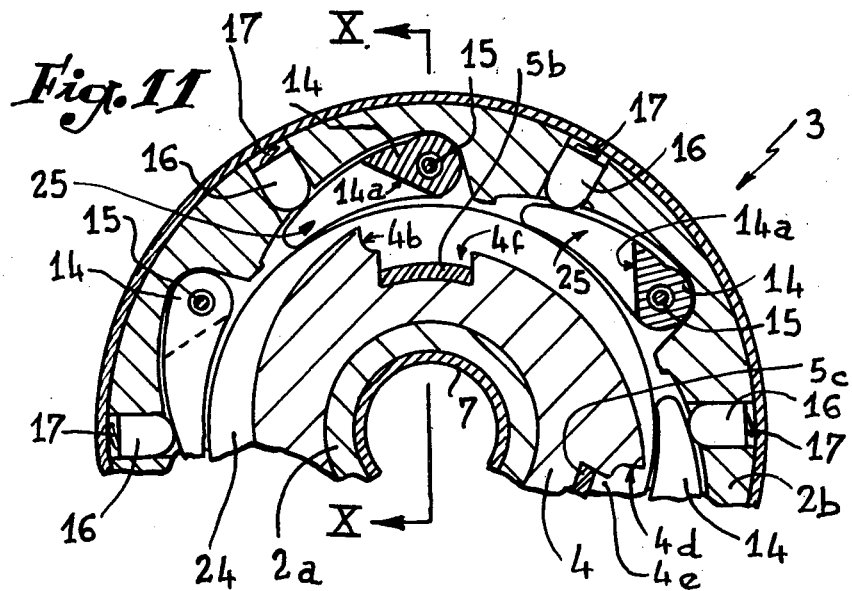
FIG. 11 is a partial section on the line XI—XI of FIG. 10.

FIGS. 10 and 11 illustrate a modified form of construction of the unidirectional drive system according to the present invention. In FIG. 10 the sleeve 5 and the ratchet wheel 4 are not sectioned, in order to facilitate understanding.

According to this modification, the ring 5e has been replaced by two transverse discs 23 and 24. The first of these is directly fastened to the sleeve assembly 5 at the level of the beginning of its arms 5b, 5c, 5d, while the second is mounted at the end of the said arms. For this to be done, each arm has a small terminal recess around which is engaged an opening provided in the disc and which is of a length such that the end of each of the arms extends outwardly beyond the disc. This projecting portion is hammered over to form heads 5f, 5g and 5h respectively, which fasten the disc 24 to the sleeve 5.

Figure 8:
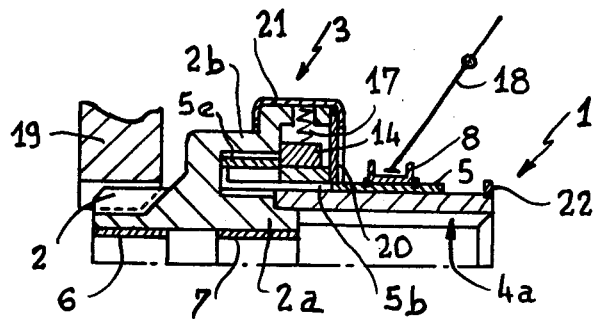

As shown more particularly in FIG. 11, each pawl 14 is machined in such a manner as to have a longitudinal slot 25 bounded by a sloping edge 14a situated near the pin 5 and enabling the pawl to fall back without striking against the disc 23, for the purpose of cooperating with the teeth of the ratchet wheel 4 when the sleeve 5 is displaced towards the left in accordance with the principle illustrated in FIGS. 7 and 8.

An embodiment of this kind makes it possible to reduce substantially the radial dimensions of the whole arrangement, because it is sufficient for the diameter of the two discs to exceed by a few tenths of a millimeter the diameter defined by the top of the teeth of the ratchet wheel. Moreover, the lost motion of the drive ring 8, and consequently that of the lever 18, is essentially limited to the thickness of the discs, which obviously makes it possible to reduce also the length dimension of the entire drive pinion assembly.

It should in addition be understood that the description given above has been given only by way of example and that it does not in any way limit the scope of the invention. In particular, it is clear that the mechanism described above could be reversed, that is to say the pawls could be carried by the driver, and the ratchet wheel by the pinion. It will also be observed that it may be advantageous to increase either the number of teeth of the ratchet wheel 4 or that of the pawls 14, in such a manner as to reduce the angular lost motion necessary for the engagement of the pawls and the teeth.

What is claimed is:

1. A drive pinion assembly for a starter having an electric motor comprising a ratchet wheel adapted to be driven by the starter motor, a cage round the ratchet wheel, a drive pinion connected to the cage for rotation therewith, at least one pivotted pawl on the cage which can move into a first position in engagement with the ratchet wheel under the influence of biassing means, and into a second position out of engagement with the ratchet wheel under the influence of centrifugal force caused by rotation of the cage, and a movable stop device which, when the pawl is in its second position, can be so located as to prevent the pawl from engaging with the ratchet wheel.

2. A drive pinion assembly according to claim 1 wherein there are a plurality of pawls and the said stop device comprises a ring which moves between the pawls and the ratchet wheel.

3. A drive pinion assembly according to claim 1, wherein there are a plurality of pawls and the said stop device comprises a plurality of discs.

4. A drive pinion assembly according to claim 1 wherein the drive pinion is movable between an operative and an inoperative position by the movement of the stop device.

5. A drive pinion assembly according to claim 1 wherein the ratchet wheel carries a bearing surface, a sleeve slides on the said bearing surface, and the stop device is carried by the sleeve.

6. A drive pinion assembly according to claim 5 wherein there is an abutment at one end of the bearing surface, and the sleeve is arranged to abut in one direction of its movement against part of the drive pinion and in the other direction or its movement against the said abutment so that it moves the drive pinion into operative and inoperative positions at the end of its movement in respective directions.

7. A drive pinion assembly according to claim 5 wherein the stop device is carried by the sleeve through a connection which includes arms running coaxially with the sleeve.

8. A drive pinion assembly according to claim 7 wherein the arms pass through peripheral openings between teeth of the ratchet wheel.

9. A drive pinion assembly according to claim 7 wherein the stop device is in the form of a thin walled cylinder fastened to the arms through radial extension of the arms.

10. A drive pinion assembly according to claim 7 wherein the stop device is formed by discs, one attached to the said arms and one carried directly by the sleeve.

11. A drive pinion assembly according to claim 10 wherein each pawl is slit so as to straddle one of the discs in order to engage the ratchet wheel when the stop device is not located in position to hold the pawl in its second position.

* * * * *